US007813766B1

(12) United States Patent
Lam (10) Patent No.: US 7,813,766 B1
(45) Date of Patent: Oct. 12, 2010

(54) ADAPTIVE SHARED APERTURE AND CLUSTER BEAMFORMING

(75) Inventor: Lawrence K. Lam, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 517 days.

(21) Appl. No.: 11/651,029

(22) Filed: Jan. 9, 2007

(51) Int. Cl.
*H04M 1/00* (2006.01)
(52) U.S. Cl. .................... 455/562.1; 343/853
(58) Field of Classification Search ............. 455/276.1, 455/13.3, 272, 273, 278.1, 279.1, 562.1
See application file for complete search history.

(56) References Cited

U.S. PATENT DOCUMENTS

| | | | | |
|---|---|---|---|---|
| 4,257,050 | A | * | 3/1981 | Ploussios .................... 342/372 |
| 5,936,592 | A | * | 8/1999 | Ramanujam et al. ........ 343/853 |
| 6,701,141 | B2 | | 3/2004 | Lam |
| 6,906,665 | B1 | | 6/2005 | Lam |
| 6,956,537 | B2 | * | 10/2005 | Scherzer et al. ............. 343/853 |
| 6,965,762 | B2 | * | 11/2005 | Sugar et al. ............... 455/276.1 |
| 7,009,560 | B1 | | 3/2006 | Lam et al. |

* cited by examiner

*Primary Examiner*—Kent Chang
*Assistant Examiner*—Dinh P Nguyen
(74) *Attorney, Agent, or Firm*—McDermott Will & Emery LLP

(57) ABSTRACT

An adaptive shared aperture and cluster beamforming antenna system includes an aperture with first and second sub-arrays, each having a plurality of antenna elements. The antenna system further includes first and second dividers configured to receive first and second signals from the first and second sub-arrays, respectively, and to provide a first and second plurality of divided signals to a corresponding first and second plurality of variable attenuators. The antenna system further includes a first combiner configured to receive a first attenuated signal from a first one of the first plurality of variable attenuators and a second attenuated signal from a first one of the second plurality of variable attenuators, and a second combiner configured to receive a third attenuated signal from a second one of the first plurality of variable attenuators and a fourth attenuated signal from a second one of the second plurality of variable attenuators.

29 Claims, 7 Drawing Sheets

ADAPTIVE SHARED APERTURE AND CLUSTER BEAMFORMING

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention generally relates to beamforming antenna arrays and, in particular, relates to beamforming antenna arrays with adaptively shared apertures.

BACKGROUND OF THE INVENTION

Electronically steered array ("ESA") antenna systems are used to provide beamforming and beamsteering functionality. Many ESA antenna systems are used in environments in which mass, size, and power limitations determine the number of components (e.g., variable phase shifters, amplifiers, etc.) and accordingly the number of beams the systems can accommodate.

SUMMARY OF THE INVENTION

The present invention solves the foregoing problems by providing an antenna system that allows multiple beams to share a single aperture with far less components than other antenna systems. Moreover, the antenna system permits multiple beams to share a single aperture in an adaptive fashion, in which overlapping beams can enjoy improved signal-to-noise ratios ("SNRs") while tracking independent signals.

According to one embodiment of the present invention, an antenna system comprises an aperture including a first sub-array and a second sub-array, the first and second sub-arrays each having a plurality of antenna elements, and a first divider configured to receive a first signal from the first sub-array and to provide a first plurality of divided signals to a corresponding first plurality of variable attenuators. The antenna system further comprises a second divider configured to receive a second signal from the second sub-array and to provide a second plurality of divided signals to a corresponding second plurality of variable attenuators, a first combiner configured to receive a first attenuated signal from a first one of the first plurality of variable attenuators and a second attenuated signal from a first one of the second plurality of variable attenuators, and to combine the first attenuated signal and the second attenuated signal into a first combined signal, and a second combiner configured to receive a third attenuated signal from a second one of the first plurality of variable attenuators and a fourth attenuated signal from a second one of the second plurality of variable attenuators, and configured to combine the third attenuated signal and the fourth attenuated signal into a second combined signal.

According to another embodiment of the present invention, an antenna system comprises a plurality of apertures, each of the plurality of apertures including two sub-arrays, each sub-array including a plurality of antenna elements, and a plurality of shared aperture beamforming network circuits, each shared aperture beamforming network circuit corresponding to one of the sub-arrays. Each shared aperture beamforming network circuit includes a divider configured to receive a signal from the corresponding sub-array and to provide a plurality of divided signals to a corresponding plurality of variable attenuators, and a combiner configured to receive a first attenuated signal from one of the plurality of variable attenuators and a second attenuated signal from a variable attenuator of another one of the plurality of shared aperture beamforming network circuits, and to combine the first attenuated signal and the second attenuated signal into a combined signal.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

According to one embodiment of the present invention, a multiple-beam antenna system utilizes shared apertures to provide a reduced component count and the concomitant reduction in mass, size, and power requirement. Moreover, antenna systems according to various embodiments of the present invention enjoy flexible antenna gain allocation and can adaptively share one or more apertures to improve the receive sensitivity/transmit power of multiple beams when the signal sources/targets are close to one another in angular space.

Figure 1:
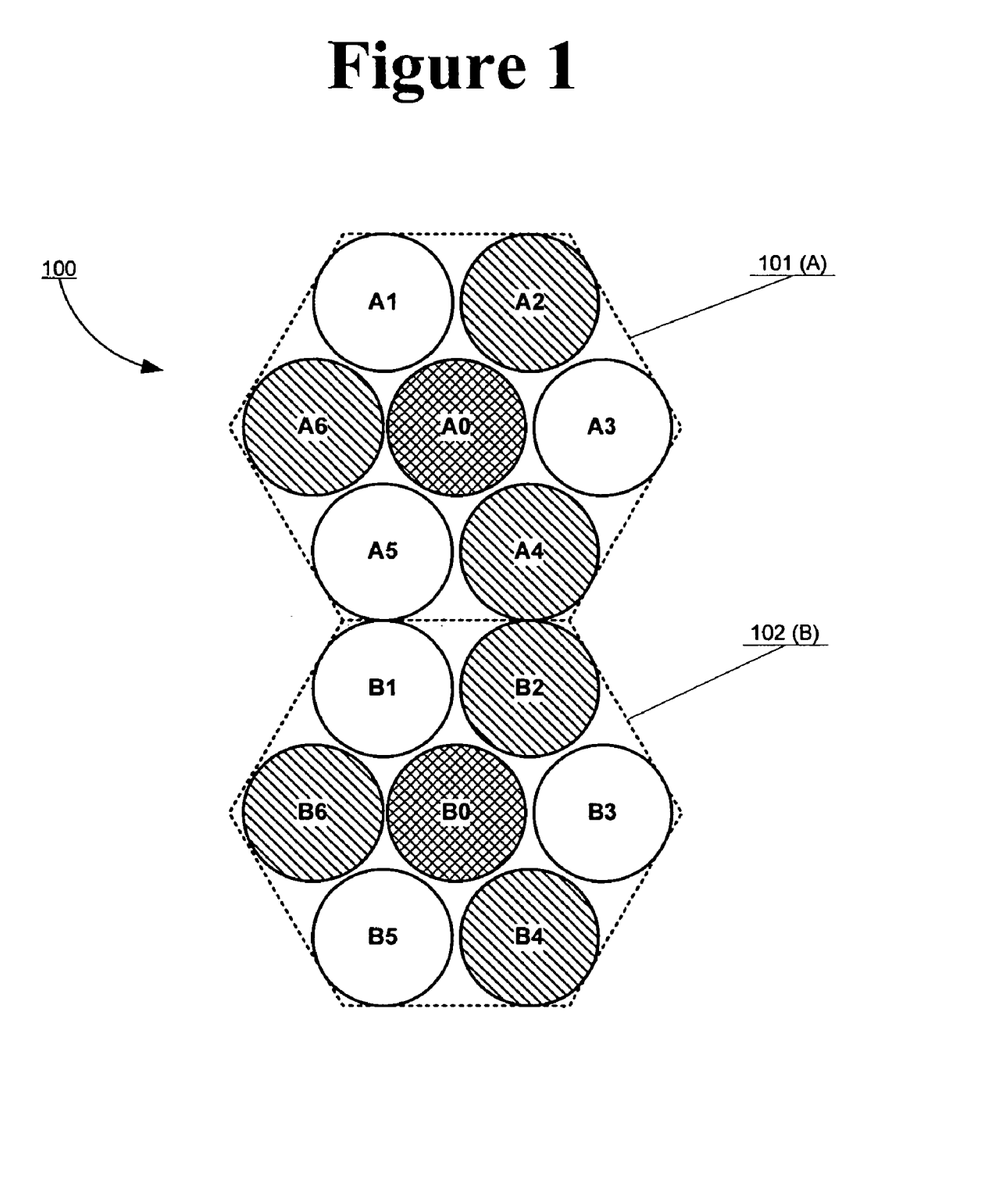
FIG. 1 illustrates a frontal view of an antenna system with two shared apertures according to one embodiment of the present invention.

FIG. 1 illustrates a frontal view of an antenna system with two shared apertures according to one embodiment of the present invention. Antenna system 100 includes two shared apertures 101 and 102. Each aperture consists of 6 antenna elements and one dummy element that, in the present exemplary embodiment, is not used. For example, shared aperture 101 includes antenna elements A1 to A6 disposed in a radial fashion around dummy element A0. Antenna elements A1, A3 and A5 (the odd elements) form one sub-array of aperture 101. Antenna elements A2, A4 and A6 (the even elements) form another sub-array of aperture 101, interleaved with the first aperture. Similarly, in aperture 102, antenna elements B1, B3 and B5 form one sub-aperture interleaved with another aperture consisting of antenna elements B2, B4 and B5.

As can be seen with reference to the exemplary embodiment illustrated in FIG. 1, the sub-arrays of each aperture 101 and 102 have a common average physical position (i.e., the average physical position for elements A1, A3 and A5 is in the center of dummy element A0, as is the average physical position for elements A2, A4 and A6). As will be described in greater detail below, providing a common average physical position for the sub-arrays of a single aperture permits the elements of one sub-array to contribute signal information to a beam formed (or tracked) by the other sub-array when the beams of each sub-array are overlapping.

Figure 2:
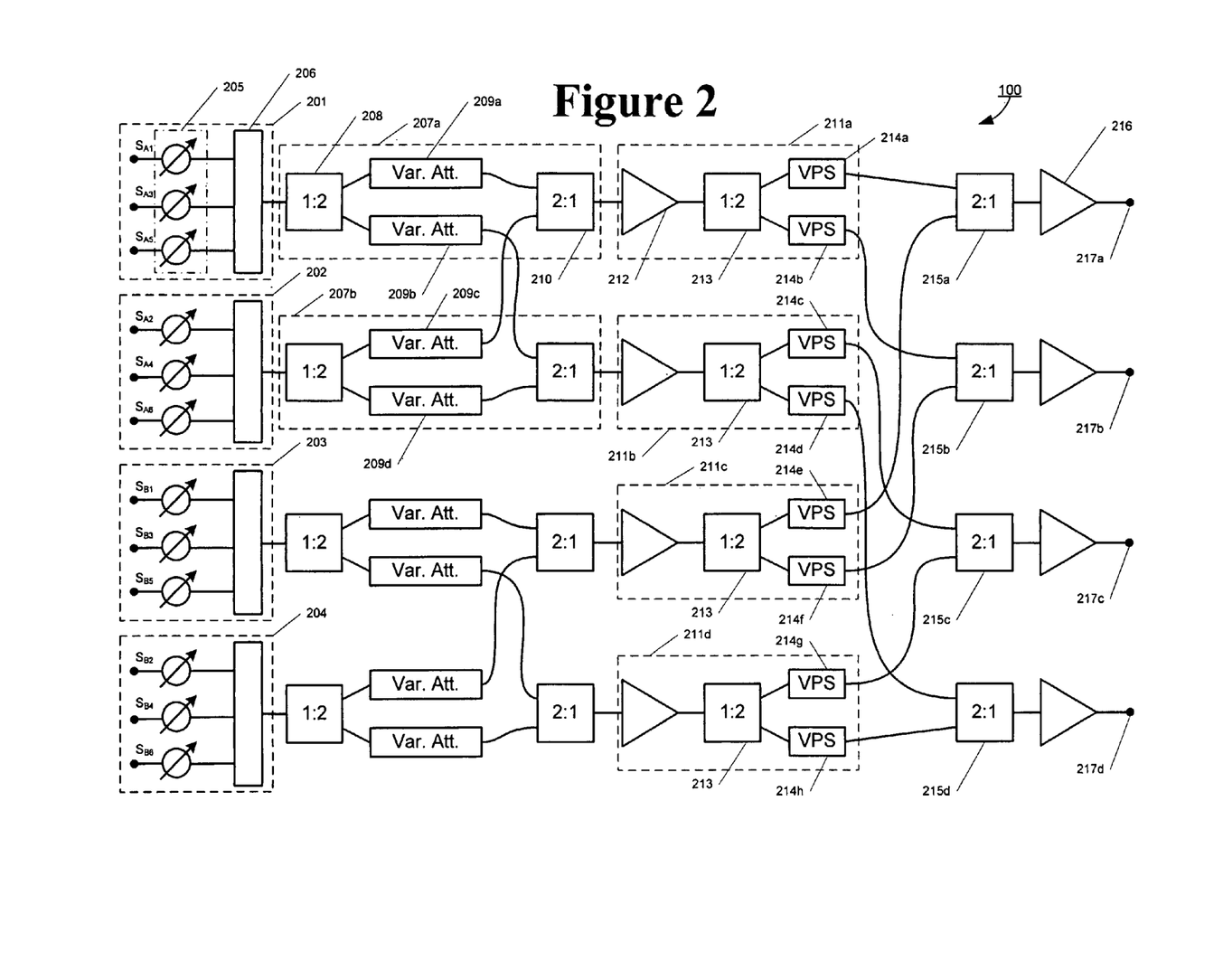
FIG. 2 illustrates a block diagram of an antenna system with two shared apertures according to one embodiment of the present invention.

Turning to FIG. 2, a block diagram of an antenna system 100 is illustrated according to one embodiment of the present invention. As illustrated above with respect to FIG. 1, antenna system 100 includes two apertures 101 and 102. Aperture 101 includes sub-arrays 201 (including odd antenna elements A1, A3 and A5) and 202 (including even antenna elements A2, A4 and A6). Similarly, aperture 102 includes sub-arrays 203 and 204 (including the odd and even elements, respectively, of aperture 102). Each sub-array further includes a variable phase shifter corresponding to each antenna element, and a combiner for combining the signals therefrom into an electrically centered output signal. For example, sub-array 201 includes three variable phase shifters 205 corresponding to the three antenna elements A1, A3 and A5. Variable phase shifters 205 receive the signals ($S_{A1}$, $S_{A3}$ and $S_{A5}$) from these antenna elements and phase shift them to ensure that the phase center (i.e., the apparent center of the radiation pattern) of sub-array 201 is the same as sub-array 202, with which it is interleaved. In a similar fashion to the common average physical position discussed above, providing a same phase center for interleaved sub-arrays allows antenna elements from one sub-array to contribute signal information to a beam steered (or tracked) by the other, interleaved sub-array.

Once the phase center of each sub-array has been aligned with the phase center of the interleaved sub-array in the same aperture by variable phase shifters 205, the signals from each sub-array are provided to a combiner, such as combiner 206, which combines the signals from that sub-array and provides the combined signal to a shared aperture beamforming network ("BFN") circuit, such as shared aperture BFN circuit 207a.

Shared aperture BFN circuit 207a includes a divider 208, which receives the combined signal from sub-array 201, divides the signal into two identical signals, and provides the two signals to variable attenuators 209a and 209b. Variable attenuator 209a provides an attenuated signal to combiner 210, while variable attenuator 209b provides an attenuated signal to a combiner disposed in the shared aperture BFN circuit 207b (which corresponds to interleaved sub-array 202). Shared aperture BFN circuit 207a further includes a combiner 210, which combines the attenuated signal from variable attenuator 209a with the attenuated signal from variable attenuator 209c (disposed in the shared aperture BFN circuit 207b corresponding to interleaved sub-array 202). Combiner 210 then provides the resultant combined signal to cluster BFN circuit 211a.

Cluster BFN circuit 211a includes an amplifier 212 (e.g., a low noise amplifier "LNA," a solid-state power amplifier "SSPA," or the like), a divider 213, and variable phase shifters 214a and 214b. The output of each variable phase shifter is directed to a different combiner (e.g., for variable phase shifters 214a and 214b, combiners 215a and 215b, respectively). In the present exemplary embodiment, there are four combiners 215a to 215d, representing antenna system 100's capacity to track four signals/steer four beams.

As can be seen with reference to FIG. 2, only two variable phase shifters are required for each sub-array in order to track four signals (e.g., corresponding to four output signals 217a-217d) or to form/steer four beams. This is because the signal provided by any sub-array can pass through dividers 208 and 213 in such a manner as to reach any one of the combiners 215a-215d (e.g., a signal from sub-array 201 can be passed from divider 208 to variable attenuator 209b, and through divider 213 to variable phase shifter 214d, from whence it passes to combiner 215d). Because each pair of interleaved sub-arrays (e.g., sub-arrays 201 and 202) have interconnected shared aperture BFN circuits (i.e., where a variable attenuator from each shared aperture BFN circuit passes an attenuated signal to the other), each sub-array can contribute signal information to a cluster BFN circuit of its interleaved counterpart.

According to one aspect of the present invention, when four signals are received by antenna 100, and the signals are within the same field of view ("FOV") of the sub-arrays, the variable attenuators in each shared aperture BFN are configured to provide an optimal signal-to-noise ratio ("SNR") to the output beams, 217a-217d. For example, if four signal sources are located close to each other in angular space (e.g., within one beamwidth of the sub-arrays), setting all of the variable attenuators (e.g., 209a-209d) to their minimum attenuation will provide the optimal SNR for all of the output beams (i.e., the antenna gain available to these signals is equal to that of the full assembly of sub-arrays). In this example, all of the output beams share the available gain of both apertures 101 and 102, and the beams are located close to each other in the angular space, forming a cluster of beams.

In an alternative example, if two of the signal sources are located close to each other in angular space (e.g., within one beam width) another two signal sources are located close to each other in angular space, separated from the first two sources by an angle greater than a sub-array beamwidth, the odd antenna elements (i.e., sub-arrays 201 and 203) of antenna 100 are allocated to output signals 217a and 217b, to receive the first pair of signal sources. The even antenna elements (i.e., sub-arrays 202 and 204) are allocated to output signals 217c and 217d to receive the second pair of signal sources. This can be accomplished by setting the appropriate attenuators to their maximum attenuation. For example, attenuator 209b is set to its maximum attenuation, so that the output signal of sub-array 201 will not be provided to cluster BFN circuit 211b, and will accordingly not be included in output signals 217c and 217d. Similarly, attenuator 209c is set to its maximum attenuation, so that the output signal of sub-array 202 will not be provided to cluster BFN circuit 211a, and will accordingly not be included in output signals 217a and 217b. In this exemplary embodiment, the antenna gain available to each of the signals 217a-217d is reduced by 3 dB. In this case, the two output beams (i.e., output signals 217a and 217b) share the aperture defined by the odd antenna elements of antenna 100 (i.e., of both apertures 101 and 102).

Similarly, the two output beams (i.e., output signals 217c and 217d) share the aperture defined by the even antenna elements of antenna 100.

According to an additional aspect of the present invention, the variable attenuators may also be used in a configuration other than that of minimum or maximum attenuation. For example, when the separation between signal sources is approximately one beam width of the sub-arrays, the variable attenuators are set to provide optimal SNR to all of the output signals 217a-217d, sharing the available antenna gain and aperture. For example, if sub-array 201 detects signal information from a signal source being tracked by a beam corresponding to output signal 217c or 217d (and which is approximately one beam width separated in angular space from a signal source being tracked by a beam corresponding to output signal 217a or 217b), variable attenuator 209b will be adjusted to a value corresponding to the difference between the SNR (in dB) of sub-array 201 and the SNR (in dB) of interleaved sub-array 202. For example, if the SNR for that signal source in the output signal of sub-array 201 is 27 dB, and the SNR for that signal source in the output signal of sub-array 202 is 30 dB, attenuator 209b may be set to −3 dB. As an additional example, if the SNR for that signal source in the output signal of sub-array 201 is 20 dB, and the SNR for that signal source in the output signal of sub-array 202 is 30 dB, attenuator 209b may be set to −10 dB. The foregoing figures are, of course, exemplary, and in no way limit the scope of the present application. Rather, as will be apparent to one of skill in the art, the variable attenuators of antenna systems according to various embodiments of the present invention may be automatically configured by a processor so as to optimize the SNR in the output signals of the antenna systems.

While the foregoing exemplary embodiment has been described with respect to operation in a receive mode, it will be apparent to one of skill in the art that a transmit mode is also expressly contemplated, in which the combiners function as dividers, and the dividers function as combiners, and the signal information proceeds from the sources to the sub-arrays, instead of the other way around.

Figure 3:
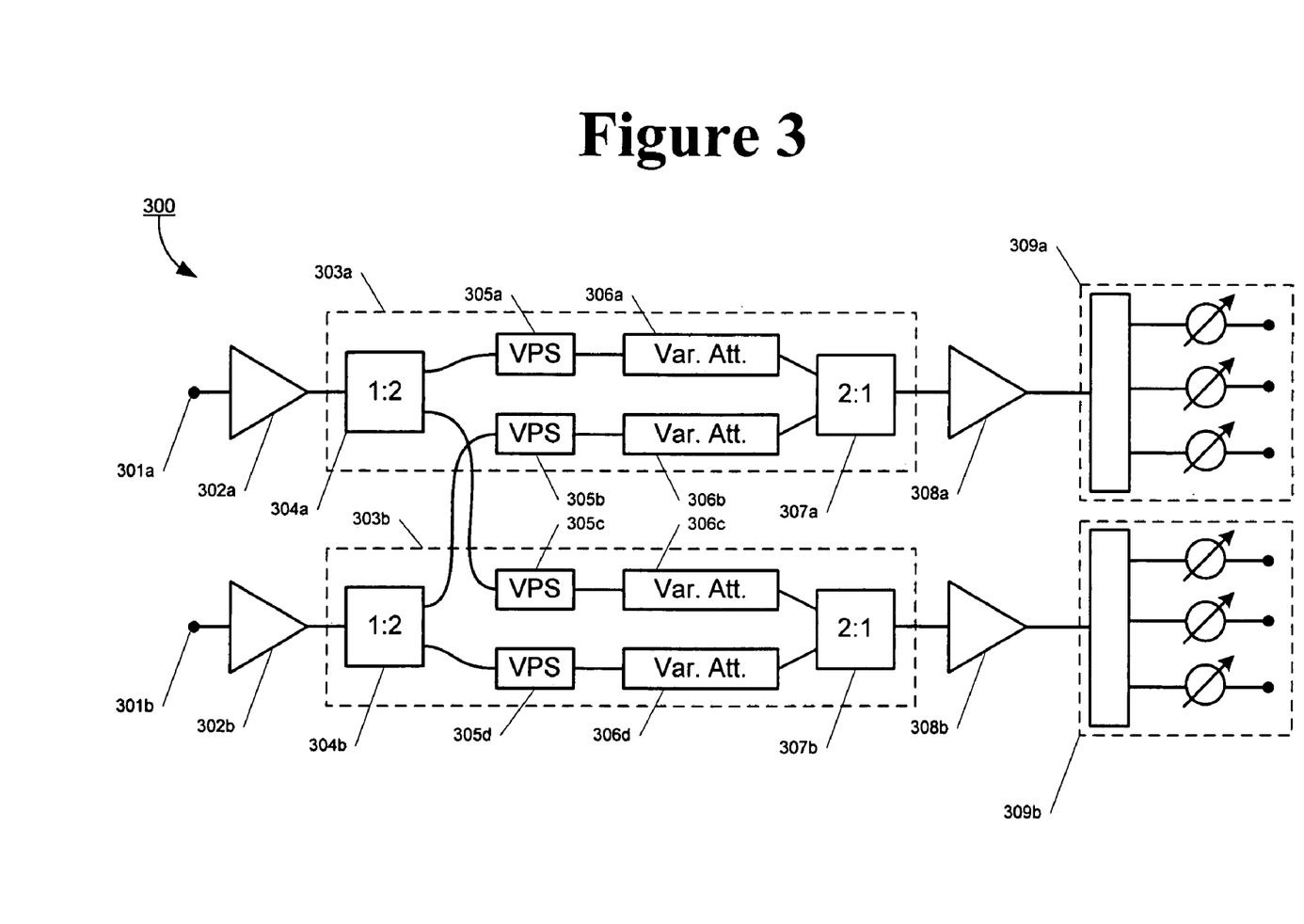
FIG. 3 illustrates a block diagram of an antenna system with one shared aperture according to one embodiment of the present invention.

Turning to FIG. 3, an antenna system 300 configured for use in a transmit mode is illustrated according to another embodiment of the present invention. Antenna system 300 is provided with two input signals 301a and 301b, which are amplified by amplifiers 302a and 302b and provided to shared aperture BFN circuits 303a and 303b, respectively. Each shared aperture BFN circuit includes a divider, two variable attenuators, and a combiner, similar to the shared aperture BFN circuits described above with respect to FIG. 2. In addition, each shared aperture BFN circuit includes two variable phase shifters corresponding to the two variable attenuators. For example, shared aperture BFN circuit 303a includes divider 304a, combiner 307a, variable phase shifters 305a and 305b, and corresponding variable attenuators 306a and 306b. Similarly, shared aperture BFN circuit 303b includes divider 304b, combiner 307b, variable phase shifters 305c and 305d, and corresponding variable attenuators 306c and 306d. Divider 304a of shared aperture BFN circuit 303a receives the amplified input signal and divides it, providing the divided signal to variable phase shifter 305a of shared aperture BFN circuit 303a, and to variable phase shifter 305c of shared aperture BFN circuit 303b. Similarly, divider 304b of shared aperture BFN circuit 303b receives the amplified input signal and divides it, providing the divided signal to variable phase shifter 305d of shared aperture BFN circuit 303b, and to variable phase shifter 305b of shared aperture BFN circuit 303a. Each variable phase shifter 305a-305d then provides the phase shifted signal to its corresponding variable attenuators 306a-306d, which in turn provide attenuated signal to combiners 307a and 307b. Accordingly, depending upon the attenuation provided by variable attenuators 306a-306d, each input signal can be provided to both of, neither of, or either of interleaved sub-arrays 309a and 309b. This arrangement supports a variety of configurations for allocating the available antenna gain to the transmit signals, providing flexible antenna gain allocation with a reduced component count.

While an antenna system of the present invention is able to control the same number of beams with fewer components (e.g., variable phase shifters) than other antenna systems, this comes at the expense of not providing a set of output beams that are completely independent from each other. Specifically, when two beams share a single aperture, the antenna gains associated with those beams are not completely independent of each other, but may differ from each other by a maximum of 3 dB. In practice, however, this lack of full independence is only a minor and acceptable limitation as output beams are frequently meant to operate together as a pair or in a group.

Figure 4:
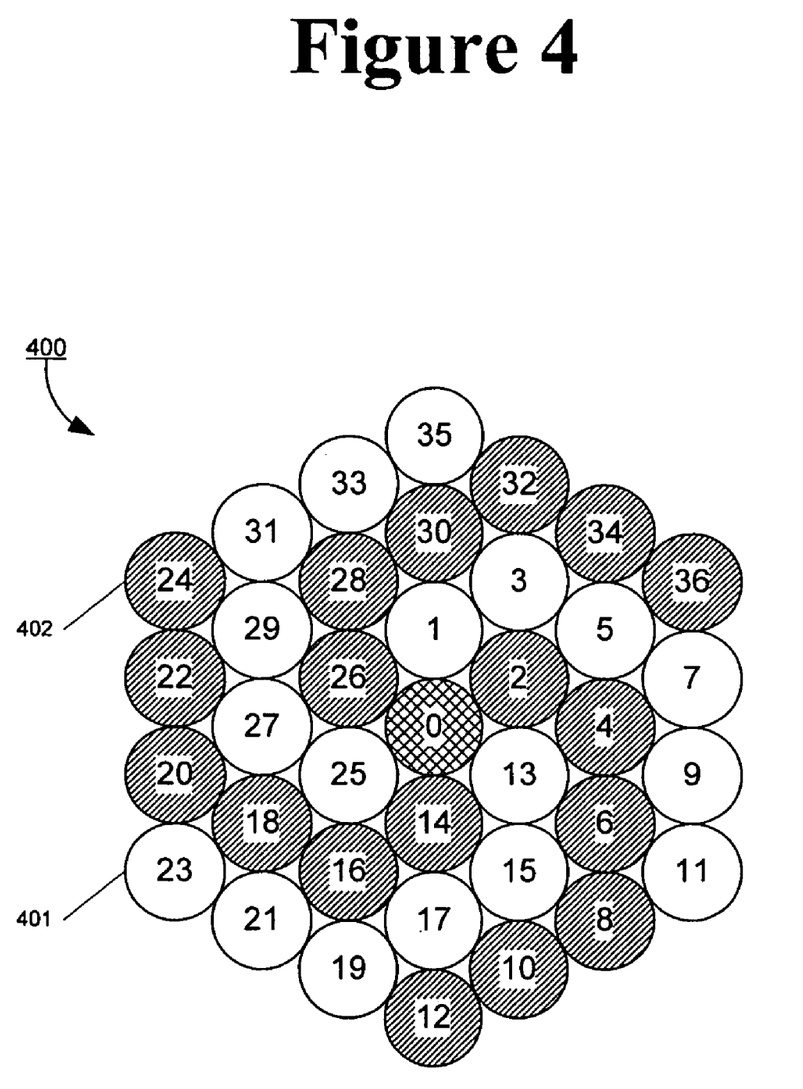
FIG. 4 illustrates an arrangement of antenna elements in a shared aperture according to one embodiment of the present invention.
Figure 5:
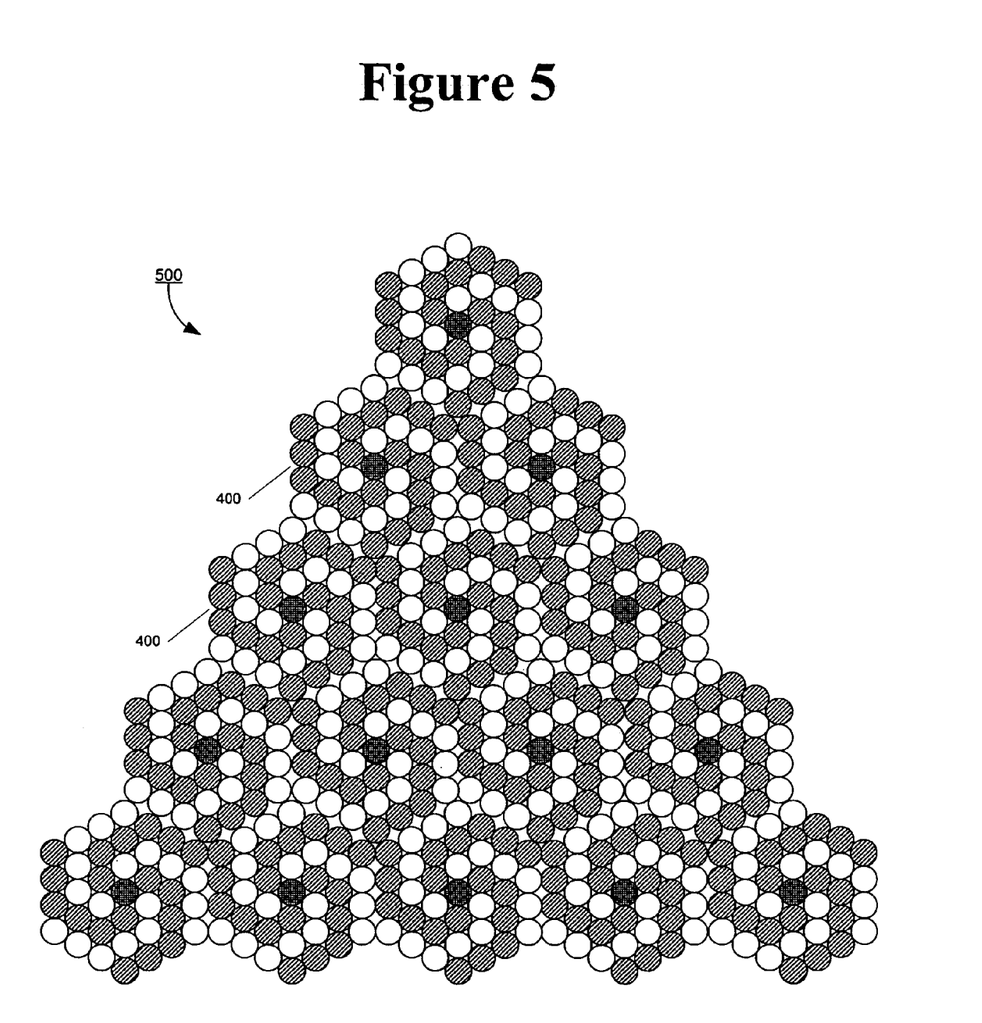
FIG. 5 illustrates an arrangement of multiple shared apertures in an antenna system according to one embodiment of the present invention.

Turning to FIG. 4, the arrangement of antenna elements in a shared aperture of an antenna system is illustrated according to one embodiment of the present invention. Aperture 400 includes 36 antenna elements, divided into two interleaved sub-arrays 401 and 402 of 18 elements each. Specifically, odd antenna elements 1, 3, 5 . . . 33 and 35 form a first sub-array 401 interleaved with sub-array 402, which is formed by even antenna elements 2, 4, 6 . . . 34 and 36. Hexagonal apertures such as aperture 400 can be easily tessellated, as can be seen with reference to FIG. 5, in which a multi-aperture system 500 with fifteen such hexagonal apertures 400 arranged in a triangular pattern is illustrated according to one embodiment of the present invention. Each aperture 400 of these multi-aperture systems may, according to one aspect of the present invention, be provided with their own shared aperture BFN circuits as illustrated with respect to FIG. 2, above. Moreover, as can be seen with reference to FIGS. 6A to 6C, such triangular multi-aperture systems can further be arranged into even larger arrays in a number of different geometric configurations.

While the foregoing exemplary embodiment has been described with reference to hexagonal apertures arranged into triangular multi-aperture arrays, the scope of the present invention is not limited to such an arrangement. Rather, as will be apparent to one of skill in the art, the present invention has application to apertures and multi-aperture arrays of any geometric shape, regular or irregular, including circles, rectangles, triangles and the like. In addition, while the foregoing exemplary embodiments have been described with reference to two-dimensional arrays, the scope of the present invention is not limited to such an arrangement. Rather, as will be apparent to one of skill in the art, the present invention has application to three-dimensional arrays as well, as is illustrated in greater detail below with respect to FIG. 7.

Figure 6A:
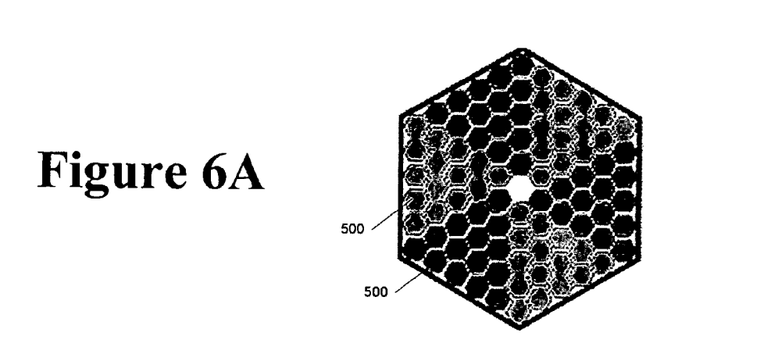
FIGS. 6A to 6C illustrate various arrangements of multiple shared apertures according to various embodiments of the present invention.
Figure 6B:
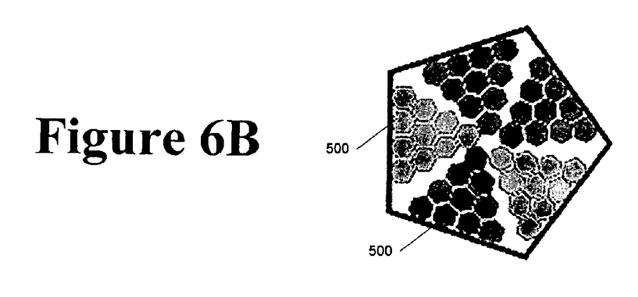
Figure 6C:
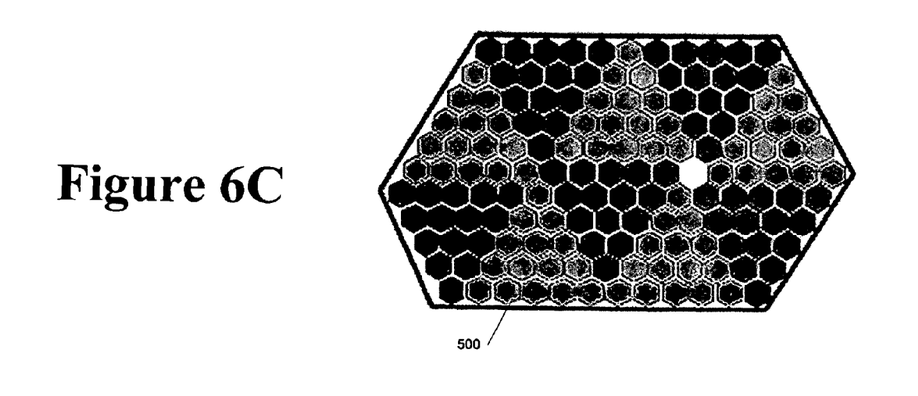
Figure 7:
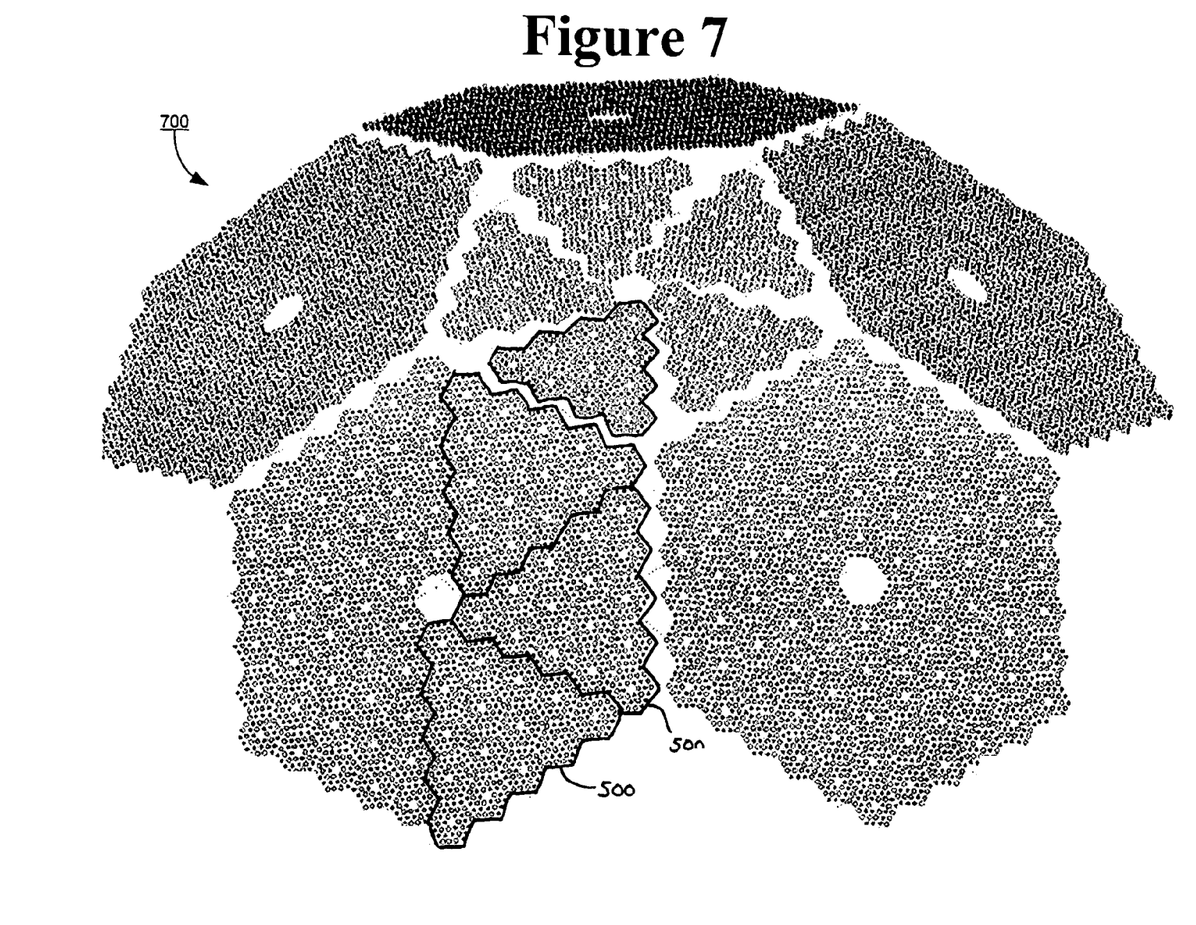
FIG. 7 illustrates an arrangement of multiple shared apertures according to one embodiment of the present invention.

FIG. 7 illustrates a multi-aperture system 700 in which a number of two-dimensional triangular multi-aperture systems 500 are arranged in a three-dimensional fashion, using the two dimensional panels illustrated in FIGS. 6A and 6B to construct an approximately dome-shaped system. As will be apparent to one of skill in the art, the multi-aperture approach of the present invention lends itself to scalability, particularly as the hexagonal aperture illustrated in FIG. 4 can be easily tessellated.

While for the sake of convenience and clarity, the foregoing exemplary embodiments have been described with reference to apertures that are shared by exactly two sub-arrays, the scope of the present invention is not limited to such an arrangement. Rather, as will be apparent to one of skill in the art, the present invention has application to antenna systems with apertures shared by any number of sub-arrays. Moreover, while for the sake of convenience and clarity, the foregoing exemplary embodiments have been described with reference to shared aperture BFN circuits with exactly two variable attenuators (and 1:2 dividers and 2:1 combiners), the scope of the present invention is not limited to such an arrangement. Rather, as will be apparent to one of skill in the art, the present invention has application to an antenna system in which any number of variable attenuators are included in a shared aperture BFN circuit. Finally, while for the sake of convenience and clarity, the foregoing exemplary embodiments have been described with reference to cluster BFN circuits with exactly two variable phase shifters, the scope of the present invention is not limited to such an arrangement. Rather, as will be apparent to one of skill in the art, the present invention has application to an antenna system in which any number of variable phase shifters are included in a cluster BFN circuit.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. An antenna system comprising:
    an aperture including a first sub-array and a second sub-array, wherein the first sub-array comprises two or more branches, each branch of the first sub-array comprising a plurality of adjacent antenna elements, the second sub-array comprises two or more branches, each branch of the second sub-array comprising a plurality of adjacent antenna elements, and the branches of the first sub-array are interleaved with the branches of the second sub-array in the aperture;
    a first divider configured to receive a first signal from the first sub-array and to provide a first plurality of divided signals to a corresponding first plurality of variable attenuators;
    a second divider configured to receive a second signal from the second sub-array and to provide a second plurality of divided signals to a corresponding second plurality of variable attenuators;
    a first combiner configured to receive a first attenuated signal from a first one of the first plurality of variable attenuators and a second attenuated signal from a first one of the second plurality of variable attenuators, and to combine the first attenuated signal and the second attenuated signal into a first combined signal; and
    a second combiner configured to receive a third attenuated signal from a second one of the first plurality of variable attenuators and a fourth attenuated signal from a second one of the second plurality of variable attenuators, and configured to combine the third attenuated signal and the fourth attenuated signal into a combined signal.

2. The antenna system of claim 1, wherein the antenna system is configured to operate in a transmit mode, and wherein the first combiner and the second combiner function as dividers, and the first divider and the second divider function as combiners.

3. The antenna system of claim 1, further comprising:
    a first plurality of variable phase shifters corresponding to the first plurality of variable attenuators; and
    a second plurality of variable phase shifters corresponding to the second plurality of variable attenuators.

4. The antenna system of claim 1, further comprising a processor configured to adjust the attenuation of each of the first and second pluralities of variable attenuators to optimize a signal-to-noise ratio of the first and second combined signals based on a signal to noise ratio of the first and second signals.

5. The antenna system of claim 3, wherein the first plurality of variable phase shifters are provided in a first cluster beamforming network circuit corresponding to the first sub-array, and wherein the second plurality of variable phase shifters are provided in a second cluster beamforming network circuit corresponding to the second sub-array.

6. The antenna system of claim 1, further comprising:
    a first plurality of variable phase shifters, each of the first plurality of variable phase shifters configured to phase shift one of the first plurality of divided signals; and
    a second plurality of variable phase shifters, each of the second plurality of variable phase shifters configured to phase shift one of the second plurality of divided signals.

7. The antenna system of claim 1, wherein the first sub-array and the second sub-array are interleaved in the aperture.

8. The antenna system of claim 7, wherein the plurality of antenna elements of the first sub-array have a same average position in the array as the plurality of antenna elements of the second sub-array.

9. The antenna system of claim 1, wherein the first sub-array and the second sub-array each include a plurality of variable phase shifters corresponding to the plurality of antenna elements.

10. The antenna system of claim 9, wherein the plurality of variable phase shifters of each of the first sub-array and the second sub-array are configured to calibrate the first sub-array and the second sub-array with a same phase center.

11. The antenna system of claim 9, wherein the first sub-array and the second sub-array each include a combiner configured to combine a plurality of phase shifted signals received from the plurality of variable phase shifters.

12. An antenna system comprising:
    a plurality of apertures, each of the plurality of apertures including two sub-arrays, wherein the first sub-array comprises two or more branches, each branch of the first sub-array comprising a plurality of adjacent antenna elements, the second sub-array comprises two or more branches, each branch of the second sub-array comprising a plurality of adjacent antenna elements, and the branches of the first sub-array are interleaved with the branches of the second sub-array in the aperture; and
    a plurality of shared aperture beamforming network circuits, each shared aperture beamforming network circuit corresponding to one of the sub-arrays, each shared aperture beamforming network circuit including:
        a divider configured to receive a signal from the corresponding sub-array and to provide a plurality of divided signals to a corresponding plurality of variable attenuators, and
        a combiner configured to receive a first attenuated signal from one of the plurality of variable attenuators and a second attenuated signal from a variable attenuator of another one of the plurality of shared aperture beamforming network circuits, and to combine the first attenuated signal and the second attenuated signal into a combined signal.

13. The antenna system of claim 12, wherein the antenna system is configured to operate in a transmit mode, and wherein each combiner functions as a divider, and each divider functions as a combiner.

14. The antenna system of claim 12, wherein each of the plurality of shared aperture beamforming network circuits includes a plurality of variable phase shifters corresponding to the plurality of variable attenuators.

15. The antenna system of claim 12, wherein each of the plurality of shared aperture beamforming network circuits includes a plurality of variable phase shifters, each of the plurality of variable phase shifters configured to phase shift one of the plurality of divided signals.

16. The antenna system of claim 12, wherein the two sub-arrays of each aperture are interleaved.

17. The antenna system of claim 16, wherein for each aperture, the plurality of antenna elements of each of the two sub-arrays have a same average position.

18. The antenna system of claim 12, wherein each sub-array includes a plurality of variable phase shifters corresponding to the plurality of antenna elements.

19. The antenna system of claim 18, wherein for each aperture, the plurality of variable phase shifters of one of the two sub-arrays are configured to calibrate a same phase center as the other one of the two sub-arrays.

20. The antenna system of claim 18, wherein each sub-array includes a combiner is configured to combine a plurality of phase shifted signals received from the plurality of variable phase shifters.

21. The antenna system of claim 12, wherein the plurality of apertures are arranged in a two-dimensional array.

22. An antenna system, comprising:
a plurality of apertures, each of the plurality of apertures including two sub-arrays, each sub-array including a plurality of antenna elements; and
a plurality of shared aperture beamforming network circuits, each shared aperture beamforming network circuit corresponding to one of the sub-arrays, each shared aperture beamforming network circuit including:
a first divider configured to receive a signal from the corresponding sub-array and to provide a plurality of divided signals to a corresponding plurality of variable attenuators,
a first combiner configured to receive a first attenuated signal from one of the plurality of variable attenuators and a second attenuated signal from a variable attenuator of another one of the plurality of shared aperture beamforming network circuits, and to combine the first attenuated signal and the second attenuated signal into a combined signal,
a second divider configured to receive the combined signal from the corresponding combiner and to provide a second plurality of divided signals to a corresponding plurality of variable phase shifters, and
a second combiner configured to receive a first phase shifted signal from one of the corresponding plurality of variable phase shifters and a second phase shifted signal from a variable phase shifter of another one of the plurality of shared aperture beamforming networks, and to combine the first and second phase shifted signals into a second combined signal.

23. The antenna system of claim 12, wherein each of the plurality of sub-arrays comprises:
a plurality of phase shifters corresponding to the plurality of antenna elements of the sub-array; and
a sub-array combiner configured to combine a plurality of phase shifted signals from the plurality of phase shifters into a combined sub-array signal, wherein the divider of the corresponding shared aperture beamforming network circuit receives the combined sub-array signal.

24. The antenna system of claim 1, further comprising a plurality of other apertures, each of the plurality of other apertures comprising a plurality of antenna elements, wherein the aperture and the plurality of other apertures are arranged to form a triangular array of apertures.

25. The antenna system of claim 24, further comprising a plurality of other triangular arrays of apertures, wherein the triangular array and the plurality of other triangular arrays are arranged in a three-dimensional configuration.

26. The antenna system of claim 1, wherein the antennas elements of the first and second sub-arrays are arranged in a hexagonal array.

27. The antenna system of claim 12, wherein the plurality of apertures are arranged to form a triangular array of apertures.

28. The antenna system of claim 27, further comprising a plurality of other triangular arrays of apertures, wherein the triangular array and the plurality of other triangular arrays are arranged in a three-dimensional configuration.

29. The antenna system of claim 12, wherein the antennas elements of the first and second sub-arrays in each aperture are arranged in a hexagonal array.

* * * * *